(12) United States Patent
Huhn, III

(10) Patent No.: US 7,128,887 B2
(45) Date of Patent: Oct. 31, 2006

(54) PLATY PRECIPITATED CALCIUM CARBONATE SYNTHESIS METHOD

(75) Inventor: Harry John Huhn, III, Catasauqua, PA (US)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 498 days.

(21) Appl. No.: 10/447,894

(22) Filed: May 29, 2003

(65) Prior Publication Data

US 2004/0241076 A1 Dec. 2, 2004

(51) Int. Cl.
*C01F 11/18* (2006.01)
*C09C 1/02* (2006.01)
*C08K 3/26* (2006.01)

(52) U.S. Cl. ............... 423/432; 423/160; 423/161; 423/165; 423/430; 106/464; 524/788

(58) Field of Classification Search ........... 423/432, 423/430, 160–161
See application file for complete search history.

(56) References Cited

U.S. PATENT DOCUMENTS 3,320,026 A 5/1967 Waldeck
4,714,603 A * 12/1987 Vanderheiden ............. 423/432
4,857,291 A 8/1989 Ota et al.
5,075,093 A * 12/1991 Tanaka et al. .............. 423/432
5,643,415 A 7/1997 Wise
5,647,902 A 7/1997 Wu
6,312,659 B1 * 11/2001 Wise ......................... 423/430

FOREIGN PATENT DOCUMENTS

| EP | 0 429 707 | | 3/1996 |
| EP | 1 151 966 | | 11/2001 |
| JP | 71007374 B | * | 2/1971 |
| JP | 2-184519 | | 7/1990 |
| JP | 08-249128 | | 8/1996 |

* cited by examiner

*Primary Examiner*—Wayne Langel
*Assistant Examiner*—Alvin T Raetzsch
(74) *Attorney, Agent, or Firm*—Leon Nigohosian, Jr.; George H. Fairchild; Ashok Tankha

(57) ABSTRACT

A process for the preparation of platy PCC comprising the steps of providing a suspension of calcium hydroxide, carbonating the suspension of calcium hydroxide, adding a condensed phosphate to the suspension prior to the completion of carbonation to precipitate platy calcium carbonate. A paper that is filled is also provided and a paper that is coated and a polymer that is filled are envisioned that use the platy PCC according to the present invention.

10 Claims, 2 Drawing Sheets

PLATY PRECIPITATED CALCIUM CARBONATE SYNTHESIS METHOD

DETAILED DESCRIPTION OF THE INVENTION

What is needed is a novel method for producing platy precipitated calcium carbonate (PCC) that is economical to use.

The present invention provides a process and a product produced by that process. What is herein disclosed is a method for producing platy PCC having the steps of providing an aqueous suspension of calcium hydroxide, carbonating the suspension of calcium hydroxide, called a slurry, adding a condensed phosphate to the slurry prior to the completion of carbonation to precipitate platy calcium carbonate. A paper that is filled with the platy PCC produced by this process is also provided. Additionally, it is envisioned that the platy PCC made according to the present invention can be used as a coating for paper or as a filler for polymers.

The product produced by the process typically comprises platelets of PCC having a width of from about 0.4 microns to about 1.0 microns and a thickness of from less than 0.10 microns to about 0.25 microns, and a specific surface area of from about 8 to about 42 square meters per gram.

Shown in FIG. 1 is a photomicrograph at a magnification of 10,000× of an exemplary precipitated platy calcium carbonate made according to the present invention as described in Example #6 below.

Shown in FIG. 2 is a schematic drawing of a PCC particle illustrating the dimensional characteristics of the substantially platy morphology according to the present invention and the manner in which the width and thickness were measured.

It has been found that the aforesaid platy PCC of the present invention can be made by a process in which the addition of a condensed phosphate occurs during the carbonation of the aqueous calcium hydroxide suspension, or slurry. In brief, the process for producing the platy PCC of the present invention involves the reaction of an aqueous suspension of calcium hydroxide with carbon dioxide in the presence of a condensed phosphate, preferably in the form of a polyphosphate or a metaphosphate and the like. In one aspect of the invention, the condensed phosphate is provided after the initiation and prior to the completion of the carbonation reaction.

In another more specific aspect, the process according to the present invention includes the steps of slaking lime (CaO) by adding water to form an aqueous calcium hydroxide suspension, or slurry, with a concentration of from about 0.09 grams calcium hydroxide/milliliter (ml) to about 0.14 grams calcium hydroxide/milliliter (ml) of slurry and, in another aspect, from about 0.11 grams calcium hydroxide/ml to about 0.13 grams calcium hydroxide/ml of slurry. The starting carbonation temperature can range between from about 8 degrees Celsius to about 18 degrees Celsius, with a temperature between from about 10 degrees Celsius to about 18 degrees Celsius being another aspect of the invention and a temperature of between from about 12 degrees Celsius to about 18 degrees Celsius being still a further aspect of the invention.

$CO_2$ gas is added to the calcium hydroxide slurry to begin the carbonation reaction. The carbonation time is from about 100 minutes to about 150 minutes, which typically requires gas flow rates of from about 0.0022 liters to about 0.0033 liters $CO_2$/minute/gram calcium hydroxide. The nature of the carbon dioxide gas for the carbonation is not particularly critical, and may be provided pure or in mixtures of carbon dioxide in either nitrogen or air. Likewise, the nature of the source for the starting calcium hydroxide slurry is not critical. The purity of the carbonating gas, water, and the lime essentially determines the purity of the final product.

During carbonation, the electrical conductivity of the reaction mixture is measured using a conductivity meter or cell such as those available from Cole-Parmer Instrument Company, Vernon Hills, Ill. or Extech Instruments Corporation, Waltham, Mass. When the reaction mixture during carbonation begins a sudden, characteristic drop in conductivity, the addition of a condensed phosphate to the slurry is initiated. Conductivity as used herein refers to the electrical conductivity properties of an aqueous slurry, which is due to the presence of ions (e.g., $Ca^{2+}$, $OH^-$) in the aqueous phase. The measurement that is made during the carbonation process is actually the specific conductivity, which is a measure of the electrical conductivity of the aqueous slurry through 1 centimeter (cm) of the slurry. The units for specific conductivity are milliSiemens per centimeter (mS/cm). The drop in conductivity at which the condensed phosphate addition is made occurs when the conductivity decreases at a rate of about 0.02 milliSiemens to about 0.04 milliSiemens per centimeter per second (mS/cm/sec). Typically, this decrease in conductivity occurs when the slurry conversion of calcium hydroxide to $CaCO_3$ is from about 60 percent to about 70 percent complete. Titration is one way to determine when about 60 percent to about 70 percent of the calcium hydroxide has been converted to calcium carbonate.

In a further aspect of the invention, the condensed phosphate is added to the calcium hydroxide slurry as an aqueous solution in amounts ranging from at least about 1.25 percent by weight of dry condensed phosphate on dry PCC yield and in another aspect, in amounts ranging from at least about 3 percent by weight of dry condensed phosphate on dry PCC yield. The condensed phosphates that may be employed in the present invention include polyphosphates and metaphosphates and the like, which are commonly used as sequestrants, deflocculants, detergent promoters, dispersants, emulsifiers, food additives, suspending agents, ceramics components, and as refractories, and include sodium tripolyphosphate, sodium hexametaphosphate, and sodium trimetaphosphate. Sodium tripolyphosphate has the formula of $Na_5P_3O_{10}$ and is also commonly referred to as STPP, STP, pentasodium triphosphate, sodium triphosphate, and triphosphoric acid. Sodium hexametaphosphate has a general formula of $Na_{(n+2)}P_nO_{(3n+1)}$ where n=6 to 21. Sodium hexametaphosphate is also commonly referred to as SHMP, Graham's salt, sodium phosphate glass, glassy sodium hexametaphosphate, glassy sodium phosphate, and glassy sodium acid metaphosphate. Sodium trimetaphosphate has the formula of $(NaPO_3)_3$. Sodium trimetaphosphate is also commonly referred to as STMP and trisodium metaphosphate.

As described above, the carbonation reaction of the process of the present invention is initiated at a temperature between from about 8 degrees Celsius to about 18 degrees Celsius and reacts over a temperature range, of from about 8 degrees Celsius to about 80 degrees Celsius, with from about 10 degrees Celsius to about 70 degrees Celsius being typical, and from about 15 degrees Celsius to about 60 degrees Celsius being most typical. When the starting carbonation temperature is above about 16 degrees Celsius, citric acid is added in an amount of up to about 0.30 percent by weight dry citric acid on dry PCC yield to form the platy PCC particle. Citric acid may also be added to the calcium hydroxide slurry at any time prior to carbonation to provide a platy PCC particle having a thickness of less than about 0.2 microns and increased surface area over the platy PCC particle produced using no citric, properties which are desirable in most paper applications (e.g., paper filling and coating). The carbonation of the calcium hydroxide slurry is continued until conversion to calcium carbonate is essentially complete and usually terminated when the pH of the carbonated slurry is from about 7.5 to about 8.0. Such carbonation is usually accomplished in a period of about four (4) hours or less. Preferred carbonation periods are from about 100 minutes to about 180 minutes. Additionally, by changing the $CO_2$ gas flow rate the reaction time may be adjusted.

The calcium carbonate may be utilized as produced in slurry form, concentrated and dispersed at high solids for use in paper coatings, or may be filtered, dried and milled for use as a dry product.

The product of the present invention has been found to be especially useful as filler in paper and, additionally, is envisioned as useful as a filler in polymers and paint and as a paper coating pigment.

The following non-limiting examples are provided to more specifically teach and set forth particular embodiments of the present invention as envisioned here. They are for illustrative purposes only, however, and are not to be construed as limiting the invention. It is recognized that minor changes and alterations can be made to the process parameters and components that are not specifically contemplated herein. However, to the extent any such changes or alterations do not materially change or affect the process or the final product, it is to be understood that such changes also fall within the scope of the invention as defined by the claims that follow.

As referred to below, specific surface area refers to the area of the surface of a particle per unit weight based on the quantity of nitrogen gas that adsorbs as a single layer of gas molecules on the particle. Once the gas adsorption properties of the material in question have been measured, then the surface area of the material in question is calculated using the Brunauer-Emmett-Teller (BET) equation, Micromeritics Flowsorb 2300 Instruction Manual, 1986. The width and thickness of the platelet-shaped particles were measured using a Philips XL-20 scanning electron microscope.

EXAMPLE 1

Platy PCC on 4 Liter Scale with Sodium Hexametaphosphate Addition

A 4-liter stainless steel agitated reactor equipped with twin gas dispersion impellers and a $CO_2$ injection tube was used to admixed 210 grams (g) of calcium oxide (CaO) with 2.1 liters of water over a 10 minute time period and an initial temperature of 41 degrees Celsius. Agitation was set at 750 revolutions per minute and a slurry having a calcium hydroxide concentration of 0.12 grams per milliliter, as determined by titration with 1 Normal (N) hydrochloric acid, was produced.

The calcium hydroxide slurry was cooled to 15.1 degrees Celsius while increasing the agitation of the reaction vessel to 1250 revolutions per minute. A carbonation reaction was initiated by adding $CO_2$ gas at a rate of 0.86 liters $CO_2$/min to the reactor. $CO_2$ gas was added as a gas mixture based on 15 percent $CO_2$/85 percent air.

The carbonation reaction temperature was held under 17 degrees Celsius during the first 12 minutes of carbonation and then was not controlled. At 89 minutes into the carbonation reaction, the electrical conductivity dropped significantly, forming a characteristic drop in the conductivity trace. This drop corresponds to a conductivity decrease at a rate of about 0.02 milliSiemens per centimeter per second (mS/cm/sec) to about 0.04 milliSiemens per centimeter per second (mS/cm/sec). The $CO_2$/air gas flow was stopped, and an aqueous solution of sodium hexametaphosphate in an amount 5.0 percent dry sodium hexametaphosphate on dry PCC by weight was added to the slurry and the slurry was mixed for an additional 10 minutes at which time addition of the $CO_2$/air gas to the reactor was resumed at a rate of 0.86 liters $CO_2$/min. When the slurry reached a pH of 8.1, $CO_2$/air gas flow was stopped. The total reaction time was 151 minutes.

Micrographs of the final product revealed the resulting calcium carbonate product comprising platelets measuring from about 0.4 to about 1.0 microns (μm) wide by from about 0.15 to about 0.20 μm thick as per FIG. 2. The BET specific surface area of the product was 39.0 $m^2/g$.

EXAMPLE 2

Platy PCC on 4 Liter Scale with Sodium Hexametaphosphate Addition

The process recited above for Example 1 was repeated except that at 86 minutes into the carbonation reaction, the electrical conductivity formed a characteristic drop in the conductivity trace corresponding to a conductivity decrease at a rate of about 0.02 milliSiemens per centimeter per second (mS/cm/sec) to about 0.04 milliSiemens per centimeter per second (mS/cm/sec). An aqueous solution of 5.0 percent dry sodium hexametaphosphate on dry PCC by weight, was continuously added to the slurry over a 40 minute time period using a peristaltic pump. Also different from Example 1 was that the aqueous solution of sodium hexametaphosphate was added to the slurry without stopping the $CO_2$/air gas flow. The $CO_2$/air gas mixture was added to the slurry to a pH 8.0. The total reaction time was 141 minutes.

Micrographs of the final product revealed the resulting calcium carbonate product comprising platelets measuring from about 0.4 to about 1.0 microns (μm) wide by from about 0.15 to about 0.20 μm thick as per FIG. 2. The BET specific surface area of the product was 9.8 $m^2/g$.

EXAMPLE 3

Platy PCC on 4 Liter Scale with Sodium Hexametaphosphate Addition

The process recited above for Example 1 was repeated except that 0.15 percent dry citric acid based on dry PCC yield by weight was added to the calcium hydroxide slurry prior to starting the carbonation reaction. At 62 minutes into the carbonation reaction, the electrical conductivity formed a characteristic drop in the conductivity trace corresponding to a conductivity decrease at a rate of about 0.02 milliSiemens per centimeter per second (mS/cm/sec) to about 0.04 milliSiemens per centimeter per second (mS/cm/sec). An aqueous solution of 5.0 percent dry sodium hexametaphosphate on dry PCC by weight was continuously added to the slurry over a 40 minute time period using a peristaltic pump. As in Example 2, the solution of sodium hexametaphosphate was added to the slurry without stopping the $CO_2$/air gas flow. The CO$_2$/air gas mixture was added to a pH 7.3. The total reaction time was 105 minutes.

Micrographs of the final product revealed the resulting calcium carbonate product was platelets measuring from about 0.4 to about 1.0 microns (μm) wide by less than 0.1 to about 0.15 μm thick as per FIG. 2. The BET specific surface area of the product was 15.4 m$^2$/g.

EXAMPLE 4

Platy PCC on 4 Liter Scale with Sodium Hexametaphosphate Addition

The process recited above for Example 1 was repeated except that citric acid was added to the calcium hydroxide slurry at a concentration of 0.30 percent dry citric acid on dry PCC yield by weight prior to starting the carbonation reaction. At 75 minutes into the carbonation reaction, the electrical conductivity formed a characteristic drop in the conductivity trace corresponding to a conductivity decrease at a rate of about 0.02 milliSiemens per centimeter per second (mS/cm/sec) to about 0.04 milliSiemens per centimeter per second (mS/cm/sec). An aqueous solution of 4.0 percent dry sodium hexametaphosphate based on dry PCC, was added continuously over a 5 minute time period to the slurry without stopping the CO$_2$/air gas flow. The CO$_2$/air gas was added to a pH 7.6. The total reaction time was 149 minutes.

Micrographs of the final product revealed the resulting calcium carbonate product comprising platelets measuring from about 0.5 to about 1.0 microns (μm) wide by from about 0.1 to about 0.2 μm thick as per FIG. 2. The BET specific surface area of the product was 42.3 m$^2$/g.

EXAMPLE 5

Platy PCC on 4 Liter Scale with Sodium Hexametaphosphate Addition

The process recited above for Example 1 was repeated except that at 70 minutes into the carbonation reaction, the electrical conductivity formed a characteristic drop in the conductivity trace. An aqueous solution of sodium hexametaphosphate was added, with the sodium hexametaphosphate being provided in an amount 3.0 percent dry sodium hexametaphosphate on dry PCC by weight. The aqueous solution of sodium hexametaphosphate was added without stopping the CO$_2$/air gas flow. The entire sodium hexametaphosphate solution was added continuously over a 5 minute period using a peristaltic pump. The CO$_2$/air gas mixture was added until the reaction mixture reached pH 8.0. The total reaction time was 110 minutes.

Micrographs of the final product revealed the resulting calcium carbonate product comprising platelets measuring from about 0.4 to about 1.0 microns (μm) wide by from about 0.15 to about 0.25 μm thick as per FIG. 2. The BET specific surface area of the product was 27.5 m$^2$/g.

EXAMPLE 6

Platy PCC on 4 Liter scale with Sodium Hexametaphosphate Addition

The process recited above for Example 1 was repeated except that 0.15 percent dry citric acid on dry PCC yield by weight was added to the calcium hydroxide slurry prior to starting the carbonation reaction. At 70 minutes into the carbonation reaction the electrical conductivity formed a characteristic drop in the conductivity trace corresponding to a conductivity decrease at a rate of from about 0.02 milliSiemens per centimeter per second (mS/cm/sec) to about 0.04 miliSiemens per centimeter per second (mS/cm/sec). An aqueous solution of 3.0 percent dry sodium hexametaphosphate based on dry PCC was continuously added to the slurry over a 10 minute time period without stopping the CO$_2$/air gas flow. The CO$_2$/air gas mixture was added to the slurry to a pH 7.4. The total reaction time was 120 minutes.

Micrographs of the final product revealed the resulting calcium carbonate product comprising platelets measuring about 0.4 to about 0.9 microns (μm) wide by less than 0.1 to about 0.2 μm thick as per FIG. 2. The BET specific surface area of the product was 25.0 m$^2$/g.

EXAMPLE 7

Platy PCC on 4 Liter Scale with Sodium Hexametaphosphate Addition

The process recited above for Example 1 was repeated except that 0.30 percent dry citric acid on dry PCC yield by weight was added to the calcium hydroxide slurry prior to starting the carbonation reaction. At 76 minutes into the carbonation reaction the electrical conductivity formed a characteristic drop in the conductivity trace corresponding to a conductivity decrease at a rate of from about 0.02 milliSiemens per centimeter per second (mS/cm/sec) to about 0.04 milliSiemens per centimeter per second (mS/cm/sec). An aqueous solution of 3.0 percent dry sodium hexametaphosphate on dry PCC by weight was continuously added to the slurry over a 40 minute time period, without stopping the CO$_2$/air gas flow. The CO$_2$/air gas mixture was added to the slurry to a pH 7.7. The total reaction time was 128 minutes.

Micrographs of the final product revealed the resulting calcium carbonate product comprising platelets measuring from about 0.5 to about 1.0 microns (μm) wide by from about 0.1 to about 0.15 μm thick as per FIG. 2. The BET specific surface area of the product was 13.6 m$^2$/g.

EXAMPLE 8

Platy PCC on 4 Liter Scale with Sodium Hexametaphosphate Addition

The process recited above for Example 1 was repeated except at 77 minutes into the carbonation reaction the electrical conductivity formed a characteristic drop in the conductivity trace corresponding to a conductivity decrease at a rate of from about 0.02 milliSiemens per centimeter per second (mS/cm/sec) to about 0.04 milliSiemens per centimeter per second (mS/cm/sec). An aqueous solution of 2.0 percent dry sodium hexametaphosphate based on dry PCC was continuously added to the slurry over a 5 minute time period without stopping the CO$_2$/air gas flow. The CO$_2$/air gas mixture was added to the slurry to a pH 7.5. The total reaction time was 125 minutes.

Micrographs of the final product revealed the resulting calcium carbonate product comprised a mixture of platelets measuring from about 0.5 to about 1.0 microns (μm) wide by from about 0.15 to about 0.25 μm thick as per FIG. 2 and prismatic crystals measuring from about 5 to about 12 μm. The BET specific surface area of the product was 17.9 m$^2$/g.

EXAMPLE 9

Platy PCC on 4 Liter Scale with Sodium Hexametaphosphate Addition

The process recited above for Example 1 was repeated except that citric acid was added to the calcium hydroxide slurry prior to starting the carbonation reaction. The citric acid was provided in an amount 0.30 percent dry citric acid based on dry PCC yield. At 78 minutes into the carbonation reaction the electrical conductivity formed a characteristic drop in the conductivity trace corresponding to a conductivity decrease at a rate of about 0.02 milliSiemens per centimeter per second (mS/cm/sec) to about 0.04 milliSiemens per centimeter per second (mS/cm/sec). An aqueous solution of 2.0 percent dry sodium hexametaphosphate on dry PCC by weight was added within a one minute time period to the slurry without stopping the $CO_2$/air gas flow. The $CO_2$/air gas mixture was added to the slurry to a pH 8.0. The total reaction time was 131 minutes.

Micrographs of the final product revealed the resulting calcium carbonate product comprised a mixture of platelets measuring from about 0.5 to about 1.0 microns (μm) wide by from about 0.1 to about 0.15 μm thick as per FIG. 2 and prismatic crystals measuring from about 5 to about 13 μm. The BET specific surface area of the product was 15.9 $m^2/g$.

EXAMPLE 10

Platy PCC on 4 Liter Scale with Sodium Hexametaphosphate Addition

A 4-liter stainless steel agitated reactor equipped with twin gas dispersion impellers and a $CO_2$ injection tube was used to admixed 210 grams (g) of calcium oxide (CaO) with 2.1 liters of water over a 10 minute time period and an initial temperature of 45 degrees Celsius. Agitation was set at 1000 revolutions per minute and a slurry having a calcium hydroxide concentration of 0.12 grams per milliliter, as determined by titration with 1 Normal (N) hydrochloric acid, was produced.

The calcium hydroxide slurry was cooled to 15.0 degrees Celsius while increasing the agitation of the reaction vessel to 1250 revolutions per minute. A carbonation reaction was initiated by adding $CO_2$ gas at a rate of 0.73 liters $CO_2$/min to the reactor. $CO_2$ gas was added as a gas mixture based on 18 percent $CO_2$/82 percent air.

The carbonation reaction temperature was held under 15 degrees Celsius during the first 10 minutes of carbonation and then was not controlled. At 76 minutes into the carbonation reaction, the electrical conductivity dropped significantly, forming a characteristic drop in the conductivity trace. This drop corresponds to a conductivity decrease at a rate of about 0.02 milliSiemens per centimeter per second (mS/cm/sec) to about 0.04 milliSiemens per centimeter per second (mS/cm/sec). An aqueous solution of sodium hexametaphosphate in an amount 1.25 percent dry sodium hexametaphosphate on dry PCC by weight was added to the slurry. The aqueous solution of sodium hexanietaphosphate was added to the slurry without stopping the $CO_2$/air gas flow. The $CO_2$/air gas mixture was added to the slurry to a pH 7.1. The total reaction time was 129 minutes.

Micrographs of the final product revealed the resulting calcium carbonate product comprised a mixture of coarse, prismatic crystals measuring from about 5 to about 35 microns (μm) in diameter and fine platelets measuring from about 0.4 to about 0.7 microns (μm) wide by from about 0.10 to about 0.20 microns (μm) thick as per FIG. 2. The BET specific surface area of the product was 8.1 $m^2/g$.

EXAMPLE 11

Platy PCC on Pilot Plant Scale with Sodium Hexametaphosphate Addition

CaO was hydrated in $H_2O$ at 50 degrees Celsius in a two-zone ZMI PORTEC slaker available from ZMI Portec Chemical Processing Group, Sibley, Iowa, yielding 644 gallons of calcium hydroxide slurry at 0.12 g/ml concentration. The calcium hydroxide slurry was added to an 850-gallon reactor and cooled to 17.0 degrees Celsius. 0.15 percent citric acid by dry weight PCC yield was added to the calcium hydroxide slurry while agitating at 197 revolutions per minute using twin gas dispersion impellers. The carbonation reaction was initiated by adding a 15 percent $CO_2$/85 percent air gas mixture to the reactor at a rate of 31 standard cubic feet per minute $CO_2$ and 176 standard cubic feet minute air. The carbonation reaction temperature was controlled and kept below 19.0 degrees Celsius during the first 13 minutes of the reaction after which time the temperature was uncontrolled. At 58 minutes into the carbonation reaction, the electrical conductivity dropped significantly, forming a characteristic drop in the conductivity trace corresponding to a conductivity decrease at a rate of from about 0.02 milliSiemens per centimeter per second (mS/cm/sec) to about 0.04 milliSiemens per centimeter per second (mS/cm/sec). An aqueous solution of 3.5 percent dry sodium hexametaphosphate on dry PCC by weight was continuously added to the slurry over a 2 minute time period without stopping the $CO_2$/air gas flow. The $CO_2$/air gas mixture was added to the slurry to a pH 7.6. The total reaction time was 100 minutes.

Micrographs of the final product revealed the resulting calcium carbonate product comprising platelets measuring from about 0.5 to about 0.9 microns (μm) wide by from about 0.10 μm to about 0.15 μm thick as per FIG. 2. The BET specific surface area of the product was 37.3 $m^2/g$.

EXAMPLE 12

Platy PCC on 4 Liter Scale with Sodium Tripolyphosphate Addition

The process recited above for Example 1 was repeated except that 0.30 percent dry citric acid on dry PCC yield by weight was added to the calcium hydroxide slurry prior to starting the carbonation reaction. At 77 minutes into the carbonation reaction the electrical conductivity formed a characteristic drop in the conductivity trace corresponding to a conductivity decrease at a rate of from about 0.02 milliSiemens per centimeter per second (mS/cm/sec) to about 0.04 milliSiemens per centimeter per second (mS/cm/sec). An aqueous solution of 3.0 percent dry sodium tripolyphosphate on dry PCC by weight was added continuously to the slurry over a 5 minute time period without stopping the $CO_2$/air gas flow. The $CO_2$/air gas mixture was added to the slurry to a pH 8.0. The total reaction time was 135 minutes.

Micrographs of the final product revealed the resulting calcium carbonate product comprising platelets measuring from about 0.4 to about 1.0 microns (μm) wide by from about 0.1 to about 0.15 μm thick as per FIG. 2. The BET specific surface area of the product was 17.8 $m^2/g$.

EXAMPLE 13

Platy PCC on 4 Liter Scale with Sodium Trimetaphosphate Addition

The process recited above for Example 1 was repeated except that 0.30 percent dry citric acid based on dry PCC yield by weight was added to the calcium hydroxide slurry prior to starting the carbonation reaction. At 73 minutes into the carbonation reaction the electrical conductivity formed a characteristic drop in the conductivity trace corresponding to a conductivity decrease at a rate of from about 0.02 milliSiemens per centimeter per second (mS/cm/sec) to about 0.04 milliSiemens per centimeter per second (mS/cm/sec). An aqueous solution of 4.0 percent dry sodium trimetaphosphate on dry PCC by weight was continuously added to the slurry over a 5 minute time period without stopping the $CO_2$/air gas flow. The $CO_2$/air gas mixture was added to the slurry to a pH 7.3. The total reaction time was 127 minutes.

Micrographs of the final product revealed the resulting calcium carbonate product comprising platelets measuring from about 0.4 to about 0.7 microns (μm) wide by less than or equal to about 0.1 μm thick as per FIG. 2. The BET specific surface area of the product was 38.6 $m^2$/g.

EXAMPLE 14

Platy PCC in Polypropylene Applications

Platy PCC pigments are loaded into a polypropylene copolymer at about a 20 percent filler loading level using an extruder. Comparative samples are made using talc and ground calcium carbonate (GCC). Injection molded samples are evaluated for optical and mechanical properties. Polypropylene samples filled with platy PCC exhibit higher Izod impact strength than samples filled with talc and GCC.

EXAMPLE 15

Platy PCC in Polyvinyl Chloride (PVC) Applications

Platy PCC and various other PVC fillers are compounded with a PVC resin at a 20 percent filler loading level using an extruder. Injection moldings are produced and tested for mechanical properties. Comparative fillers in this study include prismatic PCC, acicular PCC, and GCC. The platy PCC performs comparably with the comparative fillers with respect to notched Izod toughness, falling weight impact resistance (at 23 degrees Celsius) and ductility.

To evaluate the use of lower amounts of condensed phosphates as well as the effectiveness of other phosphate salts and acids, experiments were performed using orthophosphoric acid ($H_3PO_4$), monobasic sodium phosphate ($NaH_2PO_4$), dibasic sodium phosphate ($Na_2HPO_4$), tribasic sodium phosphate ($Na_3PO_4$), and sodium pyrophosphate ($Na_4P_2O_7$). The results are set forth in detail below.

COMPARATIVE EXAMPLE 1

A 4-liter stainless steel agitated reactor equipped with twin gas dispersion impellers and a $CO_2$ injection tube was used to admixed 210 grams (g) of calcium oxide (CaO) with 2.1 liters of water over a 10 minute time period and an initial temperature of 40 degrees Celsius. Agitation was set at 750 revolutions per minute and a slurry having a calcium hydroxide concentration of 0.12 grams per milliliter of slurry, as determined by titration with 1 Normal (N) hydrochloric acid, was produced.

The calcium hydroxide slurry was cooled to 17 degrees Celsius and the agitation increased to 1250 revolutions per minute. Citric acid was added to the calcium hydroxide slurry at a concentration of 0.30 percent dry citric acid based on dry weight PCC yield. A 20 percent $CO_2$ in air gas mixture was bubbled into the calcium hydroxide slurry at 0.84 liters $CO_2$ gas per minute. The reaction temperature was kept under 20 degrees Celsius during the first 18 minutes of the process. At 79 minutes into the carbonation reaction, the electrical conductivity dropped significantly, forming a characteristic drop in the conductivity trace corresponding to a conductivity decrease at a rate of from about 0.02 milliSiemens per centimeter per second (mS/cm/sec) to about 0.04 milliSiemens per centimeter per second (mS/cm/sec). An aqueous solution of 4.0 percent dry orthophosphoric acid ($H_3PO_4$) based on dry weight PCC was added continuously to the slurry over a 5 minute time period without stopping the $CO_2$/air gas flow. The $CO_2$/air gas mixture was added to the slurry to a pH 8.5. The total reaction time was 118 minutes.

Micrographs of the final product revealed the resulting calcium carbonate product comprised fine, poorly defined crystals. No platy or plate-shaped crystals were seen.

COMPARATIVE EXAMPLE 2

The process recited above for Comparative Example 1 was repeated except citric acid was not added to the slake prior to starting the carbonation reaction. At 75 minutes into the carbonation reaction, the electrical conductivity dropped significantly, forming a characteristic drop in the conductivity trace corresponding to a conductivity decrease at a rate of from about 0.02 milliSiemens per centimeter per second (mS/cm/sec) to about 0.04 milliSiemens per centimeter per second (mS/cm/sec). The $CO_2$/air gas flow was stopped and an aqueous solution of 7.3 percent dry monobasic sodium phosphate monohydrate ($NaH_2PO_4.H_2O$) based on dry PCC, was added to the slurry over a one minute time period and then agitated for an additional five minutes after which the carbonation reaction was resumed after by adding a 20 percent $CO_2$ in air gas mixture into the slurry at a rate of 0.84 liters $CO_2$ gas per minute to a pH 7.5. The total reaction time was 120 minutes.

Micrographs of the final product revealed coarse, elongated crystals. No platy or plate-shaped crystals were seen.

COMPARATIVE EXAMPLE 3

The process recited above for Comparative Example 2 was repeated except at 80 minutes into the carbonation reaction, the electrical conductivity dropped significantly forming a characteristic drop in the conductivity trace corresponding to a conductivity decrease at a rate of from about 0.02 milliSiemens per centimeter per second (mS/cm/sec) to about 0.04 milliSiemens per centimeter per second (mS/cm/sec). The $CO_2$/air gas flow was stopped and an aqueous solution of 5.0 percent dry dibasic sodium phosphate on dry PCC by weight ($Na_2HPO_4$) was added to the slurry. The carbonation reaction was resumed by adding a 20 percent $CO_2$ in air gas mixture into the slurry at a rate of 0.84 liters $CO_2$ gas per minute to a pH 7.7. The total reaction time was 120 minutes.

Micrographs of the final product revealed coarse, elongated crystals. No platy or plate-shaped crystals were seen.

COMPARATIVE EXAMPLE 4

The process recited above for Comparative Example 2 was repeated except at 90 minutes into the carbonation reaction, the electrical conductivity dropped significantly, forming a characteristic drop in the conductivity trace corresponding to a conductivity decrease at a rate of from about 0.02 milliSiemens per centimeter per second (mS/cm/sec) to about 0.04 milliSiemens per centimeter per second (mS/cm/sec). The $CO_2$/air gas flow was stopped and an aqueous solution of 6.5 percent dry tribasic sodium phosphate dodecahydrate, based on dry PCC by weight ($Na_3PO_4.12H_2O$) was added to the slurry. The carbonation reaction was resumed by adding a 20 percent $CO_2$ in air gas mixture into the slurry at a rate of 0.84 liters $CO_2$ gas per minute to a pH 7.2. The total reaction time was 140 minutes.

Micrographs of the final product revealed a mixture of coarse, elongated crystals and fine, poorly defined crystals. No platy or plate-shaped crystals were seen.

COMPARATIVE EXAMPLE 5

The process recited above for Comparative Example 2 was repeated except at 85 minutes into the carbonation reaction, the electrical conductivity dropped significantly, forming a characteristic drop in the conductivity trace corresponding to a conductivity decrease at a rate of about 0.02 milliSiemens per centimeter per second (mS/cm/sec) to about 0.04 milliSiemens per centimeter per second (mS/cm/sec). The $CO_2$/air gas flow was stopped and an aqueous solution of 6.5 percent dry sodium pyrophosphate ($Na_4P_2O_7.12H_2O$), based on dry PCC by weight, was added to the slurry. The carbonation reaction was resumed by adding a 20 percent $CO_2$ in air gas mixture into the slurry at a rate of 0.84 liters $CO_2$ gas per minute to a pH 8.3. The total reaction time was 120 minutes.

Micrographs of the final product revealed agglomerated, prismatic crystals. No platy or plate-shaped crystals were seen.

COMPARATIVE EXAMPLE 6

PCC on 4 Liter Scale with Sodium Hexametaphosphate Addition

A 4-liter stainless steel agitated reactor equipped with twin gas dispersion impellers and a $CO_2$ injection tube was used to admixed 210 grams (g) of calcium oxide (CaO) with 2.1 liters of water over a 10 minute time period and an initial temperature of 46 degrees Celsius. Agitation was set at 1000 revolutions per minute and a slurry having a calcium hydroxide concentration of 0.12 grams per milliliter, as determined by titration with 1 Normal (N) hydrochloric acid, was produced.

The calcium hydroxide slurry was cooled to 14.9 degrees Celsius while increasing the agitation of the reaction vessel to 1250 revolutions per minute. A carbonation reaction was initiated by adding $CO_2$ gas at a rate of 0.73 liters $CO_2$/min to the reactor. $CO_2$ gas was added as a gas mixture based on 18 percent $CO_2$/82 percent air.

The carbonation reaction temperature was held under 15 degrees Celsius during the first 10 minutes of carbonation and then was not controlled. At 76 minutes into the carbonation reaction, the electrical conductivity dropped significantly, forming a characteristic drop in the conductivity trace. This drop corresponds to a conductivity decrease at a rate of about 0.02 milliSiemens per centimeter per second (mS/cm/sec) to about 0.04 milliSiemens per centimeter per second (mS/cm/sec). An aqueous solution of sodium hexametaphosphate in an amount 1.0 percent dry sodium hexametaphosphate on dry PCC by weight was added to the slurry. The aqueous solution of sodium hexametaphosphate was added to the slurry without stopping the $CO_2$/air gas flow. The $CO_2$/air gas mixture was added to the slurry to a pH 7.2. The total reaction time was 126 minutes.

Micrographs of the final product revealed the resulting calcium carbonate product comprised coarse, prismatic crystals measuring from about 5 to about 25 microns (μm) in diameter. The BET specific surface area of the product was 4.0 $m^2$/g. No platy or plate-shaped crystals were seen.

COMPARATIVE EXAMPLE 7

PCC on 4 Liter Scale with Sodium Hexametaphosphate Addition

The process recited above for Comparative Example 6 was repeated except that 0.03 percent dry citric acid based on dry PCC yield by weight was added to the calcium hydroxide slurry prior to starting the carbonation reaction. At 78 minutes into the carbonation reaction, the electrical conductivity formed a characteristic drop in the conductivity trace corresponding to a conductivity decrease at a rate of about 0.02 milliSiemens per centimeter per second (mS/cm/sec) to about 0.04 milliSiemens per centimeter per second (mS/cm/sec). The $CO_2$/air gas flow was stopped, and an aqueous solution of sodium hexametaphosphate in an amount 0.50 percent dry sodium hexametaphosphate on dry PCC by weight was added to the slurry, and the slurry was mixed for 5 minutes after which addition of the $CO_2$/air gas flow to the reactor was resumed at a rate of 0.73 liters $CO_2$/min until a pH of 8.0 was reached. The total reaction time was 136 minutes.

Micrographs of the final product revealed the resulting calcium carbonate product was prismatic crystals measuring from about 8 to about 14 microns (μm) in diameter. The BET specific surface area of the product was 1.1 $m^2$/g. No platy or plate-shaped crystals were seen.

COMPARATIVE EXAMPLE 8

PCC on 4 Liter Scale with Sodium Hexametaphosphate Addition

The process recited above for Comparative Example 7 was repeated except that no citric acid was added to the calcium hydroxide slurry prior to starting the carbonation reaction. In addition, the temperature was not permitted to rise above 35 degrees Celsius at any point during the reaction. At 76 minutes into the carbonation reaction, the electrical conductivity formed a characteristic drop in the conductivity trace corresponding to a conductivity decrease at a rate of about 0.02 milliSiemens per centimeter per second (mS/cm/sec) to about 0.04 milliSiemens per centimeter per second (mS/cm/sec). The $CO_2$/air gas flow was stopped, and an aqueous solution of sodium hexametaphosphate in an amount 0.50 percent dry sodium hexametaphosphate on dry PCC by weight was added to the slurry. The slurry was mixed for an additional 5 minutes at which time addition of the $CO_2$/air gas flow to the reactor was resumed at a rate of 0.87 liters $CO_2$/min to a pH of 7.6. The total reaction time was 125 minutes.

Micrographs of the final product revealed the resulting calcium carbonate product was prismatic crystals measuring greater than approximately 10 microns (μm) in diameter. The BET specific surface area of the product was 1.1 m²/g. No platy or plate-shaped crystals were seen.

BRIEF DESCRIPTION OF THE DRAWINGS

Novel features and advantages of the present invention will become apparent to those skilled in the art from a reading of the following detailed description in conjunction with the accompanying drawings, wherein.

Figure 1:
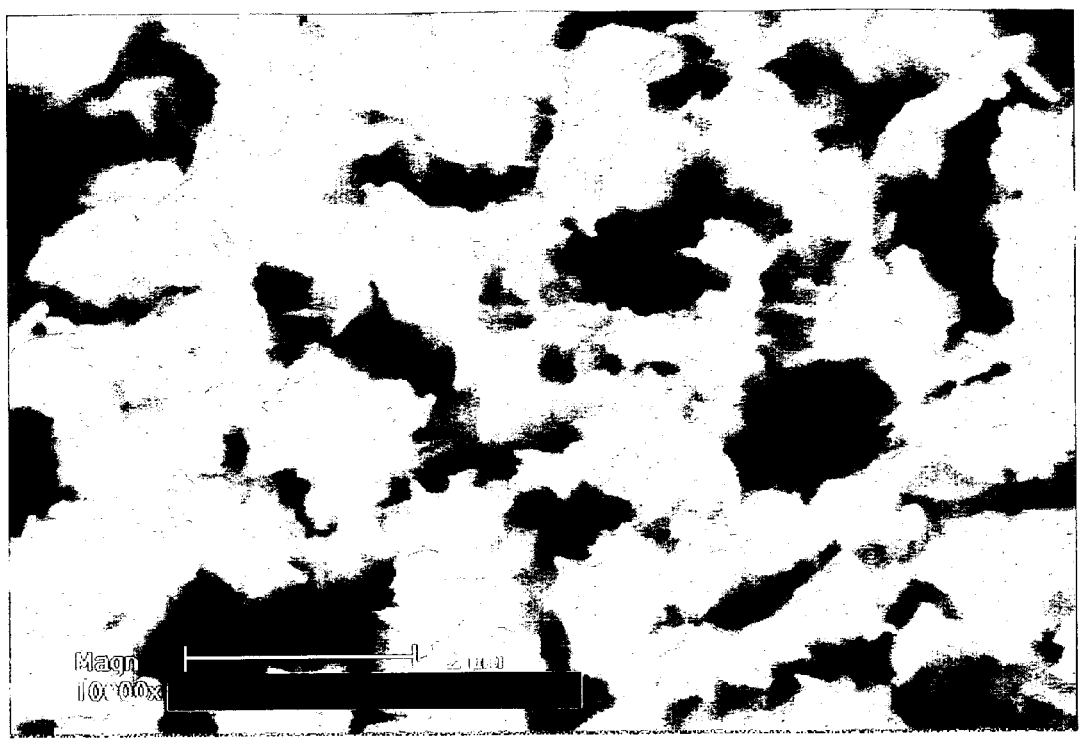
FIG. 1 is a photomicrograph at a magnification of 10,000× of the PCC of substantially platy morphology according to the present invention.
Figure 2:
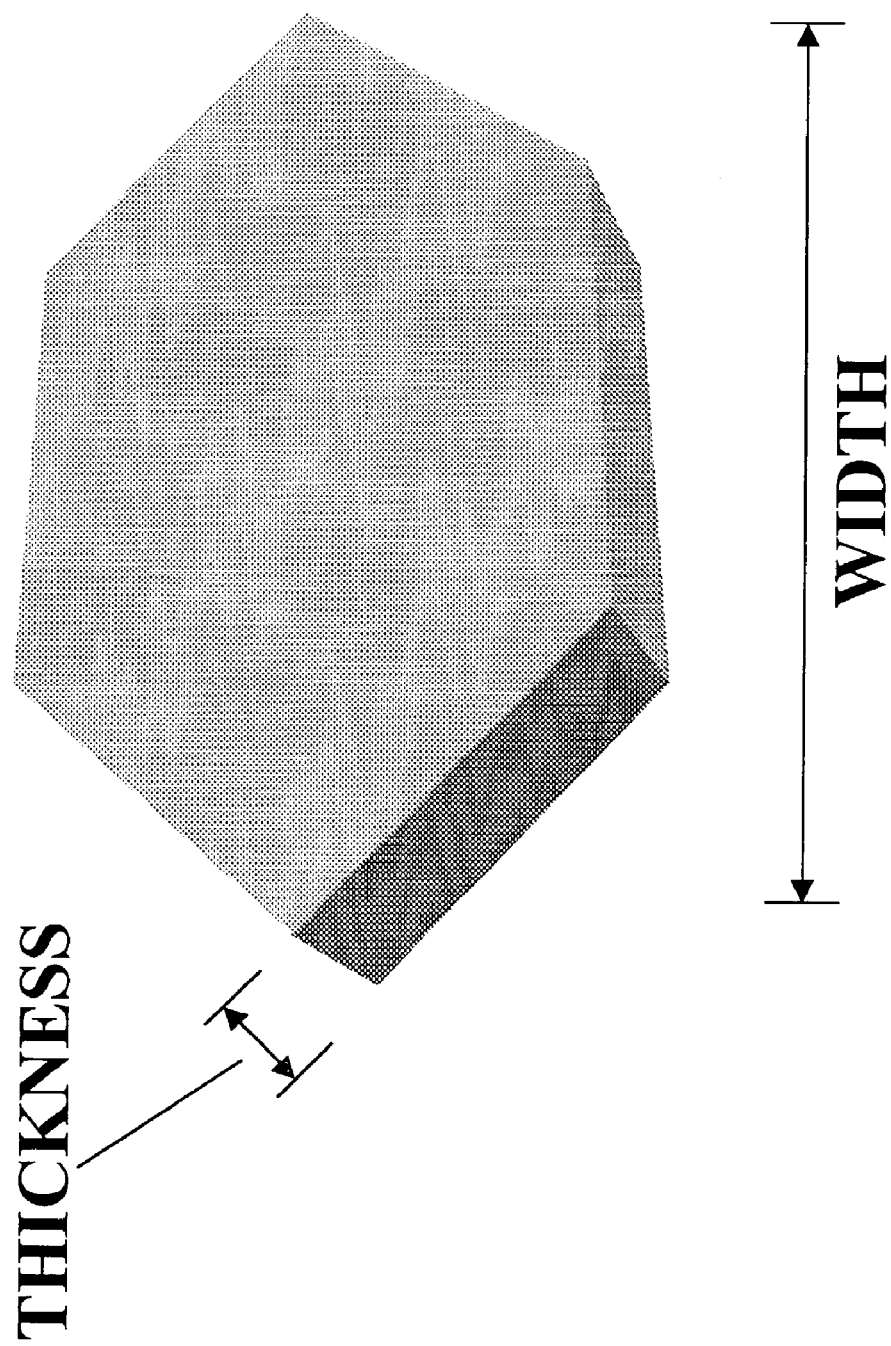
FIG. 2 is a schematic drawing of a PCC particle illustrating the dimensional characteristics of the substantially platy morphology according to the present invention.

In reviewing the phosphates tested, several trends were generally observed. First, condensed phosphates according to the present invention including polyphosphates and metaphosphates and the like were effective additives in the formation of platy PCC when used in adequate amounts as shown by Examples 1–15 as compared with other ineffective phosphates including the phosphate salts and acids of Comparative Examples 1–5. In the exemplary case of sodium hexametaphosphate, as can be seen by comparing Examples 1–11 with Comparative Examples 6–8, the use of additive levels in amounts of at least about 1.25 percent dry sodium hexametaphosphate on dry PCC by weight effectively provides for a platy PCC morphology. Moreover, increasing fractions of platy PCC are observed at higher additive levels with substantially all platy PCC being formed at additive levels of at least about 3 percent dry sodium hexametaphosphate on dry PCC by weight. Additionally, Example 11 illustrates that this platy morphology can be achieved when producing larger production scale amounts of PCC. With respect to other condensed phosphates according to the present invention, although Examples 12 and 13 illustrate that sodium tripolyphosphate (STPP) and sodium trimetaphosphate (STMP) are effective in the amounts utilized, it is expected that these additives, as well as other polyphosphates and metaphosphates, would be effective in providing for a platy PCC morphology if utilized over the same range tested for sodium hexametaphosphate, namely, above about 1.25 percent dry condensed phosphate additive on dry PCC by weight.

According to the process of the present invention, platy PCC is produced that may be used as a pigment for a variety of applications such as a filler formulation for paper and is envisioned to be useful as a filler for polymers or as a coating formulation for paper.

A supercalender groundwood handsheet study was completed to compare PCC filler (scalenohedral morphology) with the platy PCC of the present invention (prepared according to the procedure of Example 4). Paper samples were made using a 75 percent pressurized ground wood/25 percent bleached kraft pulp blend. Sheets were formed on a dynamic sheet former (Canpa Instruments, Greenfield Park, Quebec, Canada). Target basis weight was 52 grams per square meter. Cationic potato starch (STA-Lok 400, available from Staley Manufacturing Company, Decatur, Ill.) was added to the furnish at a rate of 14 pounds per ton. Filler was added to the furnish to achieve filler levels of 25 percent and 30 percent on a conditioned basis. Cationic retention aid (Percol 175 available from CIBA Specialty Chemicals Corporation, Suffolk, Va.) was added to the furnish at a rate of 0.025 percent of dry sheet weight (0.5 pound per ton). The sheets, still on the forming wire, were sandwiched between blotter paper and manually pressed. The sheets were flipped over, the bottom blotter was placed down, the screen was removed and the remaining blotter and sheet were set on top of the first blotter (2 blotters on bottom and sheet wire side up on top). A fresh blotter was placed on the sheet. The sheet was pressed between a rubber and steel roll at 30 pounds per square inch. Sheets were dried with two passes on a drum dryer (first wire side to drum, then felt side to drum) at 220 degrees Fahrenheit (104 degrees Celsius) and 22 seconds drying time. For supercalendering, sheets were pressed 4 times between a steel roll heated to 150 degrees Fahrenheit (66 degrees Celsius) and a Supertex roll nip at 1700 pounds per linear inch (2400 pounds per square inch) at conditioned sheet moisture (about 6 percent). Sheets were not reconditioned between passes. The sheets were conditioned and tested under TAPPI standard conditions of 23 degrees Celsius and 50 percent relative humidity. The resulting handsheet properties are summarized in Table I below. It was observed that the platy PCC of the present invention significantly increases paper gloss and smoothness, and significantly reduces paper porosity compared to PCC filler having a scalenohedral morphology.

TABLE 1

Paper Properties at 28 Percent Filler

| Paper Property | Scalenohedral PCC | Platy PCC Present Invention |
| --- | --- | --- |
| GLOSS, % | 36.7 | 45.2 |
| OPACITY, % | 94.3 | 94.3 |
| POROSITY, mL/min | 30.0 | 16 |
| SMOOTHNESS, PPS20, μ | 1.03 | 0.95 |

While embodiments and application of this invention have been shown and described, it will be appreciated by those skilled in the art that modifications and embodiments are possible without departing from the inventive concepts herein described. For example, although embodiments are shown and described above with respect to small batch and pilot plant batch processes, it will be apparent to those skilled in the art that these processes may be provided as full-scale batch or continuous reactions. Therefore, it is intended that the appended claims cover all such modifications and embodiments that fall within the true spirit and scope of the present invention.

What is claimed is:

1. A process for the preparation of platy PCC comprising the steps of:
   providing a suspension of calcium hydroxide;
   starting carbonation of the suspension of calcium hydroxide; and
   adding a condensed phosphate in an amount of at least about 1.25 percent dry condensed phosphate additive on dry PCC to the suspension prior to the completion of the carbonation to precipitate platy calcium carbonete; wherein the step of adding a condensed phosphate to the suspension is initiated during carbonation.

2. The process for the preparation of platy PCC according to claim 1, wherein the step of providing a suspension of calcium hydroxide is comprised of hydrating lime to form the calcium hydroxide suspension having a concentration of about 0.09 grams to about 0.14 grams calcium hydroxide per milliliter of suspension.

3. The process for the preparation of platy PCC according to claim 1, wherein the initial temperature of the suspension of calcium hydroxide prior to carbonation is in a range from about 8 degrees Celsius to about 18 degrees Celsius.

4. The process for the preparation of platy PCC according to claim 1, wherein citric acid is added in an amount up to about 0.30 percent dry citric acid on dry PCC by weight.

5. The process forte preparation of platy PCC according to claim 1, wherein the step of carbonating the suspension is performed until the pH of the resultant solution reaches about 7.0 to about 8.0.

6. The process for the preparation of platy PCC according to claim 1, wherein the step of adding a condensed phosphate to the suspension is performed without discontinuing the step of carbonating the suspension.

7. The process for the preparation of platy PCC according to claim 1, wherein the step of adding a condensed phosphate is performed by discontinuing the carbonating step, adding the condensed phosphate as an aqueous solution, mixing the suspension, and resuming carbonating the suspension to precipitate platy PCC.

8. The process for the preparation of platy PCC according to claim 1, wherein the condensed phosphate is added to the suspension during carbonation when the specific conductivity decreases at a rate of about 0.02 milliSiemens to about 0.04 milliSiemens per centimeter per second.

9. The process for the preparation of platy PCC according to claim 1, wherein the condensed phosphate added to the suspension is selected from the group consisting of sodium hexametaphosphate, sodium trimetaphosphate, and sodium tripolyphosphate.

10. The process for the preparation of platy PCC according to claim 1, wherein the condensed phosphate is added in an amount of at least about 3 percent by weight of dry condensed phosphate on dry PCC yield.

* * * * *